United States Patent [19]

Shinno

[11] 4,443,498
[45] Apr. 17, 1984

[54] METHOD FOR LINING THE INNER SURFACE OF A REDUCED PIPE LINE

[75] Inventor: Kiyonori Shinno, Habikino, Japan

[73] Assignee: Kabushiki Kaisha Nihon Plant Service Center, Osaka, Japan

[21] Appl. No.: 460,964

[22] Filed: Jan. 25, 1983

[51] Int. Cl.³ ............................ B05D 1/02; B05D 7/22
[52] U.S. Cl. .................................... 427/235; 427/236; 427/239
[58] Field of Search ............... 427/236, 238, 239, 235, 427/233; 118/317, 318, DIG. 10

[56] References Cited

U.S. PATENT DOCUMENTS

| | | | |
|---|---|---|---|
| 1,888,961 | 11/1932 | Chappell | 118/DIG. 10 |
| 3,067,721 | 12/1962 | Collins, Jr. | 118/DIG. 10 |
| 3,104,671 | 9/1963 | McLean | 118/DIG. 10 |

Primary Examiner—Evan K. Lawrence
Attorney, Agent, or Firm—Griffin, Branigan & Butler

[57] ABSTRACT

Water mains, water pipes of apartment houses or water pipes of factories with an inner diameter that varies in size in order to accommodate the sections where branch pipes are installed can be lined by this method. Firstly, mixed fluid formed by mixing paint and air is blown into a pipe line to be lined wherein the pipe line is comprised of a number of sections each having a different diameter. The mixed fluid is blown into the end of the section with the smallest diameter. A flow volume of mixture fluid that passes through the pipe with the smallest diameter is regulated for the optimum value for the size of the pipe with the smallest of diameter. Next, additional compressed air to be used for fluid volume regulation is blown into the sections of the pipe where an inner diameter varies so that the flow volume of mixture fluid that passes through the sections where an inner diameter of the pipe line varies is regulated for the optimum flow volume for the size of the pipe. Mixture fluid flows through the sections with the varied diameter with the optimum flow volume for each inner diameter, to form a lining layer from the inlet of the pipe with the smallest diameter to the outlet of the pipe with the largest diameter. When the lining processes finish, the supply of paint is stopped, while air is kept blown in to dry the lining layer for a short time. This method can be also applied to so-called reduced pipe line with a diameter larger than ¼ inch.

6 Claims, 3 Drawing Figures

METHOD FOR LINING THE INNER SURFACE OF A REDUCED PIPE LINE

BACKGROUND OF THE INVENTION

Water mains, water pipes of apartment houses or water pipes of factories gradually form scales on the inner surfaces thereof with the passage of time, and this results in decreasing the water supply capability of the pipe. The conventional method commonly employed to prevent the decrease in water supply capability of the pipe is that the inner surface of the pipe is scraped with a sand jet method, and lined, for instance, with paint for protection of the surface.

As a method to protect the inner surface of the pipe after the scraping treatment, the applicant has developed a technique to form a paint film on the inner surface of the pipe with a method in which mixed gas, formed by compressed air and paint, is sprayed inside the pipe to be treated. The mixture of air and paint is sprayed from one end and paint particles from said mixture adhere to the inner surface of the pipe, thus forming a layer of paint as required. This technique has been taught in U.S. Pat. No. 4,327,132.

In the foregoing described technique, a two-component type epoxy resin main agent and a hardening agent are mixed in a mixer to form paint. Thereafter a mixture fluid formed by epoxy resin paint and air is supplied into an accelerating fluid apparatus, and, then, mixed with further compressed air sent from a compressor to form a second mixture fluid. The second mixture fluid is sprayed inside the pipe, for which a lining is to be made, from one end of the pipe, thus forming a paint film with a uniform thickness on the inner surface of the pipe.

Paint particles contained in mixture fluid sprayed inside the pipe make contact with the inner surface of the pipe, and adhere to the surface while moving inside the pipe. Paint particles which adhere to the inner surface in the vicinity of the inlet of the pipe form liquid layers with a certain viscosity, and these layers are pushed forward in response to the force of the second mixture fluid. Accordingly, a lining film is formed from the inlet side to the outlet side of the pipe in order.

The pipe with a comparatively small inner diameter can also be lined by this method. However, it has been found that the fluid pressure is greatly reduced while passing through a pipe with a very small inner diameter, and hence a pipe, in which a worthwhile lining is to be formed by this method, is shortened in length as the inner diameter of the pipe becomes smaller.

If the required thickness of lining is 0.2-1 mm, the maximum length of the pipe to which this method is applied in relation to the inner diameter is as follows:

TABLE I

| (1B = 1 inch) Inner Diameter | Maximum Length |
| --- | --- |
| 1B | 50 m |
| 2B | 100 m |
| 3B | 150 m |
| 4B | 200 m |

According to other experiments, the optimum ranges of the flow volume of mixture fluid are as follows:

TABLE II

| Inner Diameter | Optimum Flow Volume |
| --- | --- |
| 1B | 1.5-2.5 (M$^3$/min) |

TABLE II-continued

| Inner Diameter | Optimum Flow Volume |
| --- | --- |
| 1¼B | 2.3-3.9 |
| 1½B | 3.4-5.6 |
| 2B | 6-10 |
| 3B | 13.5-22.5 |
| 4B | 24-40 |

The afore-mentioned method of lining is easily applied to form a paint film with a uniform thickness on the inner surface of the pipe if the inner diameter of the pipe line is fixed.

While the foregoing works well with pipes of uniform diameter, none of the prior-art techniques works well with pipes of varying diameters. With so-called reduced pipe lines, in which branch pipes are installed and the inner diameter of the pipe line varies at the sections where the branch pipes are installed, a flow volume of mixture fluid passing through the pipes does not remain optimum to match the inner diameter of the pipes at the sections where branch pipes are installed. That is, the flow speed of a mixture fluid will not remain constant throughout the entire length of the pipe line, i.e. the flow will be slower at a section where the diameter is large and faster at a section where the diameter is small, thus resulting in the uneven thickness of a lining film. It is to this problem that the present invention is mainly directed.

SUMMARY OF THE INVENTION

The present invention relates to a method for lining the inner surface of a pipe by solving aforementioned difficulties which are caused when a lining treatment is given to so-called reduced pipe lines when a pipe line diameter varies at the sections where branch pipes are installed.

Any type of paint can be used in the present invention. However, an ideal type of paint is one formed by mixing an epoxy resin paint main agent and a hardening agent.

With the present invention, a further mixture fluid is formed by mixing the paint mixture and compressed air. This mixture fluid is blown into the pipe from the end of the reduced pipe line which has the smallest diameter. The flow volume of the further mixture fluid is regulated for the optimum volume in accordance with the size of the pipe having the smallest diameter by means of a flow volume regulation valve.

In addition, in a preferred embodiment an opening (for instance, an opening made by removing a branch pipe at an appropriate section) is prepared at the sections where an inner diameter varies, and compressed air is supplied into the opening from an air supplier such as a compressor via a flow volume regulation valve. Compressed air flow, supplied from each branch pipe, is regulated so that the flow volume of mixture fluid along the pipe section located downstream of the branch pipe connection becomes an appropriate value for the diameter of the immediate pipe section.

For instance, if the inner diameter of a pipe immediately connected to receive the mixture fluid formed by mixing paint and air is 1 inch, the flow volume of mixture fluid passed thereto should be 1.5-2.5 (M$^3$/min).

When the inner diameter of the main pipe connected to the first branch pipe is 1¼ inches, then from Table II [(2.3-3.9)−(1.5-2.5)=] (0.8-1.4) M$^3$/min of an air flow is supplied into the main pipe line by regulating the flow volume regulation valve of the branch pipe so that the appropriate flow volume (2.3–3.9 M³/min) for lining the pipe with a 1¼ inches diameter is obtained.

As above, if the inner diameter of the main pipe, whereat the second branch pipe is connected, is 1½ inches, then from Table II [(3.4–5.6)−(2.3–3.9)=], (1.1–1.7) M³/min of an air flow is supplied into the pipe line from the second branch pipe so that the appropriate flow volume for lining the pipe with a 1½ inches diameter is obtained.

As mentioned before, the present invention insures a relatively constant flow speed of mixture fluid throughout the entire length of the pipe line since enough air to regulate the flow volume is supplied as required from the section where the inner diameter of the pipe varies into the pipe line.

This results in a high preformance and uniform lining inside the entire inner surface of the reduced pipe line, eliminating cloggings of paint in the pipe, and avoiding uneven thickness of the lining at the pipe sections with a large diameter and a small diameter.

Furthermore, whether or not the diameter of the pipe varies the length of pipe that can be effectively lined in a single process is extended 2–3 times compared with that done by a conventional method, thus resulting in a great improvement in operation efficiency. At the same time, with this method, a smooth lining work is ensured because cloggings of paint, even on the curved pipe, are avoided.

Therefore, as explained before, it can be said that the utility of the present invention is very high.

BRIEF DESCRIPTION OF THE DRAWINGS

The objects and feature of the present invention can be better understood by consideration of the following description taken in conjunction with the drawings in which.

DETAILED DESCRIPTION

While the present invention is taught in connection with pipes of varying diameters, it should be understood that the present invention has great utility with a pipe of uniform diameter to increase the length of pipe that can be lined in one process.

Figure 1:
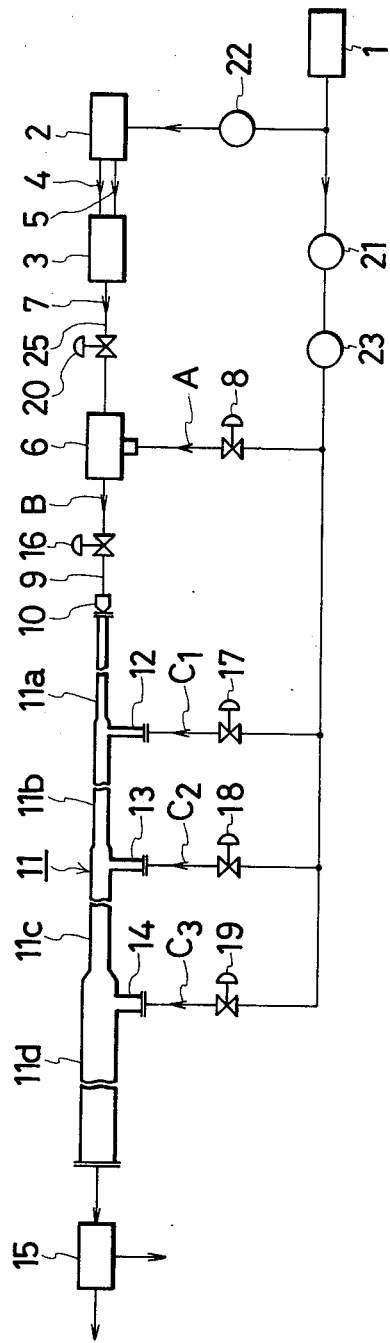
FIG. 1 is an overall diagram showing the first embodiment of the method of lining of the present invention.
Figure 2:
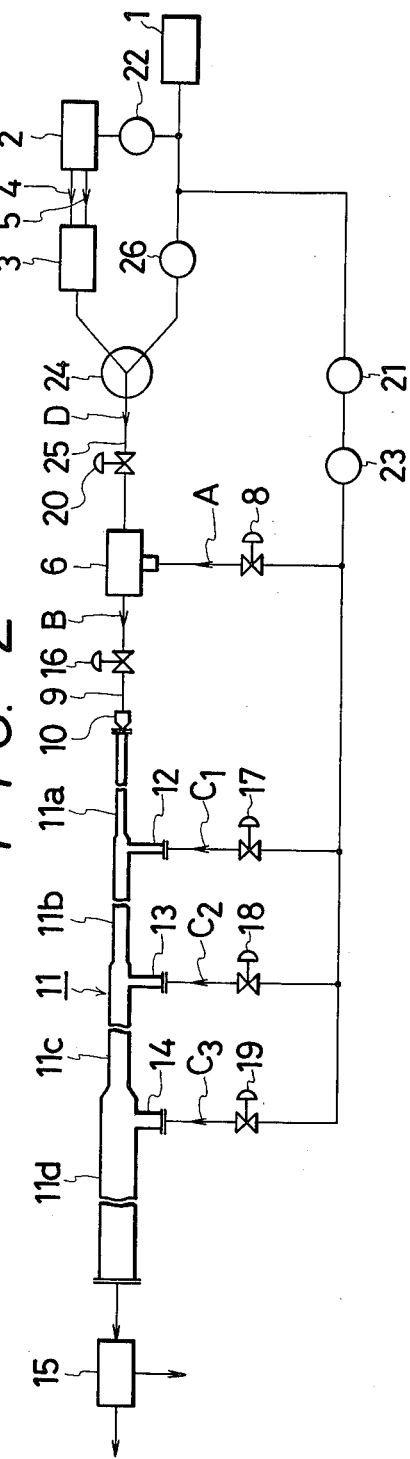
FIG. 2 is an overall diagram showing the second embodiment of the method of lining of the present invention.

Refer to FIGS. 1 and 2 of the drawings. Item number 1 is a compressed air supplier such as an air compressor. Item number 2 is a compressed-air-driven lining machine equipped with a paint tank and a compression pump for paint. In the preferred embodiment the air driven lining machine may be of the type manufactured by Nihon Plant Service Center, model no. APW-1200W. Item number 3 is a paint mixing apparatus, in which an epoxy resin paint as a main agent 4 and a hardening agent 5 are mixed to form paint with an appropriate viscosity to be used for lining. In the preferred embodiment the paint mixing apparatus may be of the type manufactured by Nihon Plant Service Center, model no. PMS-I. Item number 6 is an accelerating fluid apparatus. Epoxy resin paint 7, which has a pressure of approximately 200–250 kg/cm², is mixed and regulated for a fixed ratio and concentration by said paint mixing apparatus 3, and made into a mist and passed through a nozzle (not shown in the figure) to one input port of the accelerating spray apparatus 6. Compressed air A of approximately 5–20 kg/cm² is sent from said air compressor 1 into said accelerating fluid apparatus 6 via a flow volume regulation valve 8. Aforementioned paint 7 and compressed air A are sufficiently mixed in the accelerating fluid apparatus 6 to form mixture fluid B, which is simultaneously accelerated. Item number 9 is a tube to receive mixture fluid B. Item number 10 is a nozzle device to receive mixture fluid B. Item number 11 is a reduced pipe line having four sections to which a lining treatment is to be given. Branch pipes 12, 13 and 14 are installed to open into the reduced pipe line. The diameter of the pipe varies at the sections where these branch pipes are installed. 11a, 11b, 11c, and 11d are the four sections where the diameter of afore-mentioned reduced pipe line varies. Item number 15 is a withdrawal device. Item number 16 is a flow volume regulation valve for mixture fluid B. Items numbered 17, 18 and 19 are the flow volume regulation valves for air. Item number 20 is a flow volume regulation valve for paint. Items numbered 21, 22 and 26 are pressure regulators. Item number 23 is an air flow meter.

In accordance with the present invention a method for lining of the inner surface of a reduced pipe line includes the step of cutting a reduced pipe line 11 to a suitable length. Both ends of the cut pipe line are kept open. The length of the reduced pipe line 11 to be lined is determined in accordance with the inner diameter of each section of the pipe. For instance, when a reduced pipe line 11 consists of a part with an inner diameter of 1 inch, a second part with an inner diameter of 2 inches and a third part with an inner diameter of 3 inches, the maximum lengths of the pipes with the inner diameters of 1 inch, 2 inches and 3 inches, for which a lining can be made, are respectively 50 meters, 100 meters and 150 meters, thus making the total length of the reduced pipe line 11 which can be lined equal to 300 meters. It should also be understood that when the length of a section with an inner diameter of 2 inches is longer than 100 meters, it becomes difficult to line if the lining is to be done over the entire length. Therefore, a section with an inner diameter of 2 inches and which is more than 100 meters in length needs to be cut into lengths of approximately 100 meters or less. That is to say, the section to be lined is divided into two parts, namely a first part consisting of a section of pipe with an inner diameter of 1 inch plus a section of pipe with an inner diameter of 2 inches measuring 100 meters and a second part consisting of a remaining section of pipe with an inner diameter of 2 inches plus a section of pipe with an inner diameter of 3 inches. Next, branch pipes 12, 13 and 14 are removed, and the openings for supplying air C1, C2 and C3 are employed to regulate a flow volume. With ordinary water pipes, a branch pipe is normally installed at the connected section where the diameter of the next section is reduced. Therefore, said branch pipes can be used as the opening for air supply to regulate a flow volume. Furthermore, the inner surface of the pipe is fully cleansed with a sand jet method, etc., and dried thoroughly afterwards.

When the preparation for the lining process is completed, a compressed air supplier 1 such as an air compressor is switched on. Air which pressure is lowered to approximately 3–10 kg/cm² using a pressure regulator 21 is supplied to an accelerating fluid apparatus 6, via said flow volume regulation valve 8. At the same time, lining machine 2 is driven by supplying said lining machine 2 with compressed air via a pressure regulator 22. Then, an epoxy resin paint main agent 4 and a hardening agent 5 sent with pressure from a lining machine 2 are mixed in a mixer 3, to form paint with a fixed viscosity. The preparation of work is completed when these steps have taken place.

Then, flow regulation valves 17, 18 and 19 are closed, while a flow regulation valve 16 is opened. A regulation valve 8 is also opened and the reading of air flow volume meter 23 is used to match the caliber of the narrowest pipe passage 11a as mentioned later. When aforementioned flow volume regulation work is completed, a paint regulation valve 20 is opened. Paint and an air flow are mixed inside an accelerating fluid apparatus 6, and paint particles are carried by the air flow at the rate of 0.1–0.3 kg/m³. Mixture fluid B containing paint particles at the rate of 0.1–0.3 kg/m³ is lead into a mixture fluid spray nozzle 10 with pressure of approximately 5–10 kg/cm², and sprayed inwards into the end of pipe 11a which has a small diameter. The structure of nozzle 10 can be better seen in FIG. 3. Below Table III shows the range of the flow volume of mixture fluid B sprayed into the pipe with a small diameter. Said flow volume ranges are the values obtained by analyzing the results of repeated experiments on lining.

TABLE III

| (1B = 1 inch) Caliber of Pipe | Ranges of Optimum Flow Volume of Mixture Fluid B Flow Rate of Mixture Fluid A (m³/min) |
|---|---|
| 1B | 1.5–2.5 |
| 1¼B | 2.3–3.9 |
| 1½B | 3.4–5.6 |
| 2B | 6–10 |
| 3B | 13.5–22.5 |
| 4B | 24–40 |

Through experiments, and judging from a treatment time and an adhesive power of a film, it is found that an optimum flow volume is 2.0 m³/min in a pipe of caliber 1B; 8 m³/min in a pipe of caliber 2B; and 38 m³/min in a pipe of caliber 4B, when the paint mixture rate is 0.2 kg/m³.

The speed of forming a paint film is normally in the range of 3–5 m/min. When the estimated time required for lining a pipe passage 11a has elapsed, a flow volume regulation valve 17 is opened. By supplying compressed air into a branch pipe 12, a fixed volume of air C1 is supplied (the proper amount is checked with flow volume meter 23) so that the flow volume of mixture fluid B in a pipe passage 11b matches its caliber.

Likewise, when the proper time to line pipe section 11b has elapsed, a flow volume regulation valve 18 is opened. A fixed volume of air C2 is supplied (as mentioned above the amount is checked with a flow volume meter 23) so that the flow volume of mixture fluid B in a pipe passage 11c corresponds to its caliber. By repeating the same operation, the flow volume of mixture fluid B in the pipe passage 11d, with the largest diameter, is finally regulated.

In the embodiment of the present invention, flow volume regulation valves 16, 17, 18 and 19 are manually regulated. However, it is possible that the operations could be done automatically with a sequence control means linked with the reading of flow volume meter 23.

Figure 3:
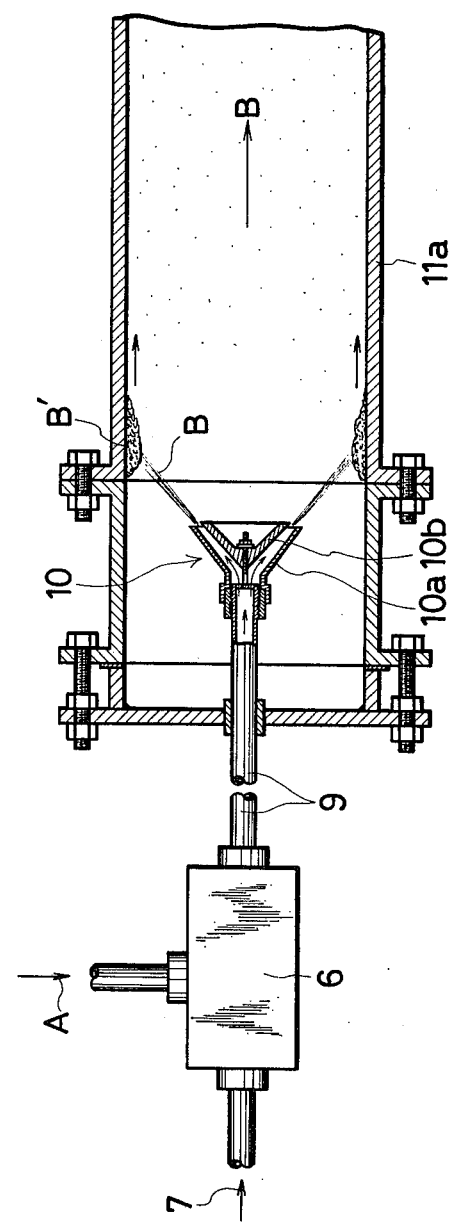
FIG. 3 illustrates a spray apparatus for mixture fluid.

As illustrated in FIG. 3, mixture fluid B is sprayed into the end of a pipe passage 11a through a hollow, reverse circular cone, passing between a cover body 10a and a guide body 10b. The illustrated structure enables the fluid mixture to move forward while colliding with an inner surface of the pipe. The paint particles contained in mixture fluid adhere to the inner surface of the pipe. Paint particles which adhere to the inner surface in the vicinity of the inlet of the pipe form a liquid layer body B', but are gradually pushed forward in response to air flow of mixture fluid B.

On the other hand, in a pipe passage 11b, which has a larger caliber, the flow speed of mixture fluid B is maintained at a certain fixed value because a fixed volume of air C1 is regulated and supplied from a branch pipe 12. Therefore, the aforementioned liquid paint layer body B' is pushed forward and moves at almost the same speed in the pipe passage 11b, with its big caliber, as it does in a pipe passage 11a. *Likewise, it goes through inside the pipe passages 11c and 11d at nearly the same fixed speed.*

Mixture fluid B with a slight amount of paint particles is issued from the end of a pipe passage 11d during the treatment processes. Paint and air in mixture fluid are separated in a withdrawal device 15, and paint is recovered.

When the lining is completed to the end of a pipe passage 11d, the spray of mixture fluid B is terminated. Then, by sending air through the pipe sections for drying, any extraneous paint is pushed forward and the paint film formed is dried. With aforementioned operations, a paint film is formed with a very uniform thickness of 0.2–1 mm on the inner surface of the pipe at the speed of 3–5 m/min.

In the embodiment of the present invention, air compressed by a compressor is used. However, this can be replaced with high-pressure nitrogen gas, etc. Mixture fluid B can be released while revolving, or can be dispersed forward in the mist through a nozzle, etc., instead of making the mode of a hollow, reverse circular cone.

Furthermore, as illustrated in FIG. 2, paint 7 can be mixed with air in a spare mixing device 24. Mixture fluid D made of air and paint can be put into an accelerating fluid apparatus 6 to make so-called 2-stage mixture so that paint can be easily sent to an accelerating fluid apparatus 6 even when a pipe passage 25 is long. In this embodiment of the present invention, paint 7 formed by mixing an epoxy resin main agent and a hardening agent is used. However, any kind of paint can be replaced for this paint.

The embodiments of the invention in which an exclusive property or privilege is claimed are defined as follows:

1. A method for lining the inner surface of a pipe line with a lining material comprising the steps of: forming a mixture of lining material and compressed air; directing said mixture at a predetermined flow volume rate into a first open end of said pipe line so that said mixture comes in contact with said inner surface of said pipe line and depositing particles of said lining material thereon; adding additional compressed air at predetermined locations along said pipe line to keep the flow volume of said mixture at predetermined values along the length of said pipe line; and removing said mixture from a second open end of said pipe line.

2. A method for lining the inner surface of a pipe line according to claim 1 where said lining material is paint.

3. A method for lining the inner surface of a pipe line according to claim 1 wherein said pipe line is comprised of a number of sections each having a different diameter and wherein said first open end opens into the section having the smallest diameter.

4. A method for lining the inner surface of a pipe line according to claim 3 wherein each of said predetermined locations is located in a different one of said sections after the section with the smallest diameter.

5. A method for lining the inner surface of a pipe line according to claim 4 wherein the adding of the additional compressed air is done sequentially in each of the sections after the preceding section has been lined.

6. A method for lining the inner surface of a pipe line according to claim 5 wherein there are further included the steps of terminating the forming of the mixture of lining material when the pipe line has been completely lined and passing compressed air through said pipe line to dry said paint.

* * * * *